United States Patent
Yang et al.

(10) Patent No.: US 10,266,062 B2
(45) Date of Patent: Apr. 23, 2019

(54) SYSTEM AND METHOD FOR CHARGING A VEHICLE BATTERY BY CONTROLLING A RELAY BETWEEN THE BATTERY AND A VEHICLE SYSTEM

(71) Applicant: HYUNDAI MOTOR COMPANY, Seoul (KR)

(72) Inventors: Hui Tae Yang, Seoul (KR); Kyung Ho Kim, Ansan-si (KR); Woo Sung Kim, Suwon-si (KR); Kyung In Min, Seongnam-si (KR); Do Sung Hwang, Gunpo-si (KR); Jae Hoon Choi, Gunpo-si (KR); Beom Joo Kwon, Hwaseong-si (KR); Dong Gil Ha, Yongin-si (KR); Beom Gyu Kim, Hwaseong-si (KR); Jong Hu Yoon, Jeollanam-do (KR); Bo Ram Yang, Pyeongtaek-si (KR); Hee Sung Moon, Seoul (KR); Yu Seok Kim, Seoul (KR); Jung Je Woo, Goyang-si (KR); Suk Hyung Kim, Gunpo-si (KR); Hyun Soo Park, Anyang-si (KR)

(73) Assignee: Hyundai Motor Company, Seoul (KR)

( * ) Notice: Subject to any disclaimer, the term of this patent is extended or adjusted under 35 U.S.C. 154(b) by 130 days.

(21) Appl. No.: 15/374,714

(22) Filed: Dec. 9, 2016

(65) Prior Publication Data

US 2018/0086220 A1 Mar. 29, 2018

(30) Foreign Application Priority Data

Sep. 26, 2016 (KR) ........................ 10-2016-0122833

(51) Int. Cl.
*H01M 10/44* (2006.01)
*H01M 10/46* (2006.01)
(Continued)

(52) U.S. Cl.
CPC ....... *B60L 11/1838* (2013.01); *B60L 11/1816* (2013.01); *B60L 11/1864* (2013.01);
(Continued)

(58) Field of Classification Search
CPC .................. H02J 7/0026; H02J 7/0029; H02J 2007/0037; H02J 2007/0039
(Continued)

(56) References Cited

U.S. PATENT DOCUMENTS 6,211,577 B1 4/2001 Alksnat et al.
8,552,686 B2 10/2013 Jung et al.
(Continued)

FOREIGN PATENT DOCUMENTS

JP 2004203178 7/2004
JP 2008309041 A 12/2008
(Continued)

OTHER PUBLICATIONS

KR Notice of Allowance dated Apr. 16, 2018, Notice of Allowance cited in the corresponding Korean Patent Application No. 10-2016-0122833; dated Apr. 16, 2018; 6 pages.

*Primary Examiner* — Edward Tso
(74) *Attorney, Agent, or Firm* — Lempia Summerfield Katz LLC

(57) ABSTRACT

A system for charging a vehicle battery includes a relay configured to establish/interrupt electrical connection between the vehicle battery and a vehicle system supplied with power from the vehicle battery, and a controller. The controller is configured to monitor a voltage of the battery, control the relay to interrupt the electrical connection when a voltage of the battery is less than or equal to a first predetermined reference value, and control the relay to establish the electrical connection when a predetermined condition is satisfied while the relay is electrically discon-
(Continued)

nected. The controller controls the relay to be electrically connected to charge the battery through an external power source while the electrical connection is interrupted, and then control a connection state of the relay based on the voltage of the battery, a voltage and current of the relay at a side of the vehicle system, and whether a vehicle is started.

10 Claims, 3 Drawing Sheets

(51) Int. Cl.
  B60L 11/18 (2006.01)
  H02J 7/00 (2006.01)
(52) U.S. Cl.
  CPC ........... *H02J 7/007* (2013.01); *Y02T 10/7011* (2013.01); *Y02T 10/7061* (2013.01); *Y02T 10/7072* (2013.01); *Y02T 90/121* (2013.01); *Y02T 90/128* (2013.01); *Y02T 90/14* (2013.01); *Y02T 90/163* (2013.01)
(58) Field of Classification Search
  USPC .......................... 320/104, 107, 109, 134, 136
  See application file for complete search history.

(56) References Cited

U.S. PATENT DOCUMENTS

| | | | |
|---|---|---|---|
| 8,664,912 | B2 | 3/2014 | Olsberg |
| 9,108,521 | B2 | 8/2015 | Jung et al. |
| 2004/0066168 | A1 | 4/2004 | George et al. |
| 2009/0218988 | A1 | 9/2009 | Richardson et al. |
| 2010/0244766 | A1 | 9/2010 | Olsberg |
| 2011/0057611 | A1* | 3/2011 | Nakaso ................ B60W 20/15 320/109 |
| 2011/0288705 | A1 | 11/2011 | Kawasaki et al. |
| 2012/0268068 | A1 | 10/2012 | Jung et al. |
| 2014/0002026 | A1 | 1/2014 | Jung et al. |
| 2015/0251550 | A1 | 9/2015 | Stegmueller et al. |
| 2016/0082854 | A1 | 3/2016 | Richardson et al. |

FOREIGN PATENT DOCUMENTS

| | | |
|---|---|---|
| JP | 2012152003 | 8/2012 |
| JP | 2014187731 A | 10/2014 |
| JP | 2015173589 | 10/2015 |
| JP | 2016077039 A | 5/2016 |
| KR | 19960027847 | 8/1996 |
| KR | 19970054774 | 7/1997 |
| KR | 20010111135 | 12/2001 |
| KR | 20110081098 | 7/2011 |
| KR | 20120093058 | 8/2012 |
| KR | 20120136828 | 12/2012 |
| KR | 20130078099 | 7/2013 |
| KR | 101315645 | 10/2013 |
| KR | 20140090881 | 7/2014 |
| KR | 1020160007899 A | 1/2016 |
| WO | 2011106343 | 9/2011 |
| WO | WO2013075672 A1 | 5/2013 |

\* cited by examiner

SYSTEM AND METHOD FOR CHARGING A VEHICLE BATTERY BY CONTROLLING A RELAY BETWEEN THE BATTERY AND A VEHICLE SYSTEM

CROSS-REFERENCE TO RELATED APPLICATION

This application claims the priority benefit of Korean Patent Application No. 10-2016-0122833, filed on Sep. 26, 2016, in the Korean Intellectual Property Office, the disclosure of which is incorporated herein by reference.

BACKGROUND

1. Field

The present embodiments relate to a system and a method for charging a vehicle battery.

2. Description of the Related Art

An electric vehicle or fuel cell vehicle, which is an eco-friendly vehicle, is provided with a low-voltage battery (e.g., an auxiliary battery) to provide power for starting the vehicle and to provide power to electrical loads operating at a low-voltage. An internal combustion engine vehicle, which drives an engine using fossil fuel, is also provided with a rechargeable battery to provide power for starting the vehicle or to provide power to electrical loads.

A lead acid battery, which is inexpensive to manufacture, has been mainly used as the battery. However, in the future, the lead acid battery is expected to be replaced by a lithium battery, which has a long service life and excellent electrical properties.

Since the lithium battery should not be fully discharged due to the properties thereof, the auxiliary battery implemented by the lithium battery is installed such that electrical connection between the auxiliary battery and the vehicle system is interrupted by using a relay if the charge level of the auxiliary battery is lowered below a predetermined threshold voltage (e.g., a lower discharge voltage limit). An auxiliary battery system having the lithium battery and the relay described above is provided to be appropriately controlled according to various situations, and accordingly, is to be managed using a separate controller such as a battery management system for a vehicle.

Typically, a controller implemented by the battery management system monitors the voltage of the battery and interrupts connection of the relay to completely separate the battery from the vehicle system if the voltage of the battery is less than or equal to a reference voltage for determining overdischarge. Thereby, the controller prevents further consumption of power of the battery.

According to the conventional control technique described above, if the voltage of the battery is less than a reference voltage for prevention of overcharge when the battery is charged through reconnection of the relay using an external power source, a control operation is performed to interrupt connection of the relay. Accordingly, the battery may not be normally charged with the conventional control technique.

In addition, if the battery is not sufficiently charged when the external power source connected for charging with the vehicle started after reconnection of the relay is removed and the vehicle is turned off, the controller may not be provided with power. Thereby, the relay becomes uncontrollable and is thus left in the connected state even when the voltage of the battery is less than the reference voltage for prevention of overcharge. Thereby, the battery may be excessively discharged, and performance of the battery may be degraded.

The details of the background art described above are merely intended to promote an understanding of the background of the present embodiments and should not be construed as suggesting that the present embodiments correspond to conventional technology known to those skilled in the art.

SUMMARY

The present embodiments are provided in view of the above problems. A system and a method for charging a vehicle battery that allow the battery to be sufficiently charged after a relay for determining the state of electrical connection between the battery and a vehicle system is reconnected are provided.

In accordance with an aspect, the above and other objects may be accomplished by the provision of a system for charging a vehicle battery. The system includes a relay configured to establish/interrupt electrical connection between the battery and a vehicle system supplied with power from the battery, and a controller. The controller is configured to monitor a voltage of the battery, control the relay to interrupt the electrical connection when a voltage of the battery is less than or equal to a first predetermined reference value, and control the relay to establish the electrical connection when a predetermined condition for reconnection is satisfied while the relay is electrically disconnected. The controller controls the relay to be electrically connected to charge the battery through an external power source while the electrical connection is interrupted, and then controls a connection state of the relay based on the voltage of the battery, a voltage and current of the relay at a side of the vehicle system, and whether a vehicle is started.

In one embodiment, the system may further include a current sensor configured to detect a current to a terminal of the relay at the side of the vehicle system. When the voltage of the battery is less than or equal to a second predetermined reference value, and a detected value of the current sensor corresponding to a current supplied to the battery is greater than a third predetermined reference value, the controller may control the relay to maintain the electrical connection.

In one embodiment, the controller may monitor the voltage of a terminal of the relay at the side of the vehicle system. When the voltage of the battery is less than or equal to a second predetermined reference value, and a difference in voltage between a difference between the voltage of the battery and a voltage of the terminal at the side of the vehicle system is greater than or equal to the second predetermined reference value, the controller may control the relay to maintain the electrical connection.

In one embodiment, when the voltage of the battery is less than or equal to a second predetermined reference value, and a vehicle switches from an On state to an Off state, the controller may control the relay to interrupt the electrical connection.

In accordance with another aspect, a method for charging a vehicle battery by controlling an electrical connection state of a relay configured to establish/interrupt electrical connection between the battery and a vehicle system is provided. The battery supplies power to the vehicle system. The method includes controlling the relay to establish the electrical connection when an external power source is connected to a terminal of the relay at a side of the vehicle system to charge the battery. The connection state of the relay establishing the electrical connection is determined based on a voltage of the battery, a voltage and current of the relay at the side of the vehicle system, and whether a vehicle is started.

In one embodiment, the determining may include controlling the relay to maintain the electrical connection when the voltage of the battery is less than or equal to a second predetermined reference value and a value of a detected current supplied to the battery is greater than a third predetermined reference value.

In one embodiment, the determining may include controlling the relay to maintain the electrical connection when the voltage of the battery is less than or equal to a second predetermined reference value and a difference between the voltage of the battery and a voltage of the terminal at the side of the vehicle system is greater than the second predetermined reference value.

In one embodiment, the determining may include controlling the relay to interrupt the electrical connection when the voltage of the battery is less than or equal to a second predetermined reference value and the vehicle switches from an On state to an Off state.

In accordance with another aspect, a system for charging a vehicle battery is provided. The system includes a relay configured to determine electrical connection between the battery and a vehicle system. The vehicle system is supplied with power from the battery. The system also includes a controller configured to control a connection state of the relay. The controller is configured to enter a reconnection charge mode when a voltage of the battery is less than or equal to a second predetermined voltage with an external power source connected and the relay reconnected. The controller is also configured to control the relay to maintain the electrical connection when a magnitude of a current supplied from the external power source to the battery is greater than or equal to a third predetermined reference value or a difference in voltage between opposite terminals of the relay is greater than or equal to a fourth predetermined reference value in the reconnection charge mode. The controller is configured to control the relay to interrupt the electrical connection when the vehicle switches from an On state to an Off state in the reconnection charge mode.

In one embodiment, the controller may release the reconnection charge mode when the voltage of the battery is maintained to be greater than the second predetermined voltage for more than a fifth predetermined reference value.

BRIEF DESCRIPTION OF THE DRAWINGS

The above and other objects, features, and other advantages of the present embodiments will be more clearly understood from the following detailed description taken in conjunction with the accompanying drawings, in which.

DETAILED DESCRIPTION OF THE PREFERRED EMBODIMENTS

Reference will now be made in detail to various embodiments of a system for charging a vehicle battery of, examples of which are illustrated in the accompanying drawings. Wherever possible, the same reference numbers will be used throughout the drawings to refer to the same or like parts.

Figure 1:
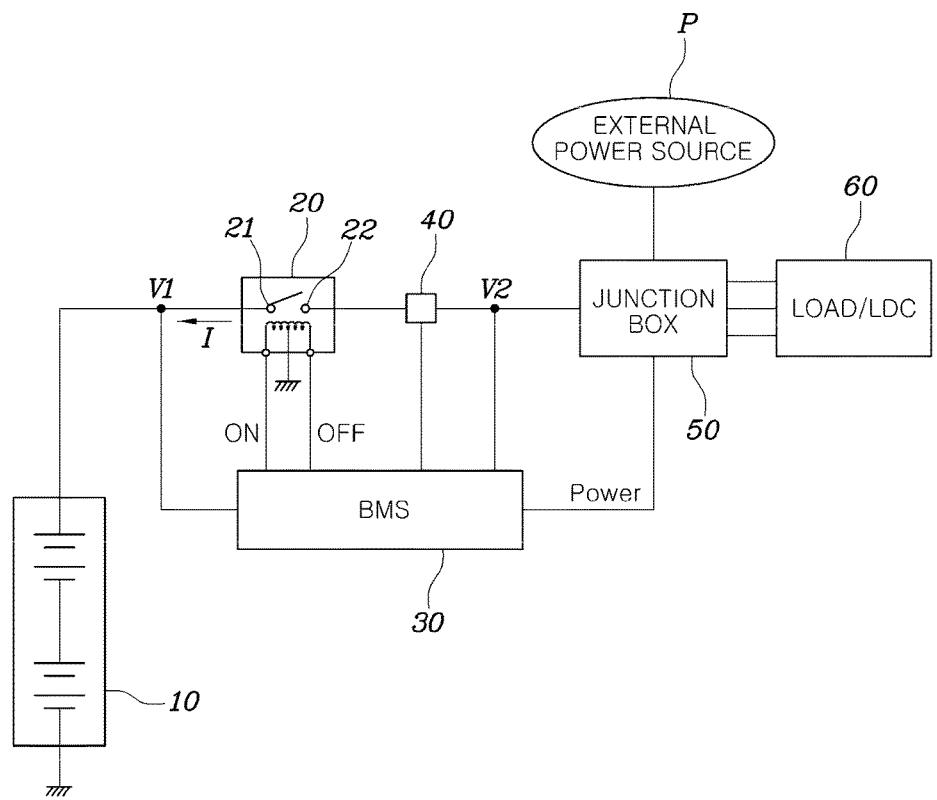
FIG. 1 is a block diagram illustrating a system for charging a vehicle battery according to an embodiment.

FIG. 1 is a block diagram illustrating a system for charging a vehicle battery according to an embodiment.

Referring to FIG. 1, a system for charging a vehicle battery according to an embodiment may include a battery 10, a relay 20 having a front terminal 21 connected to the battery 10 and a rear terminal 22 electrically connected to and disconnected from the front terminal according to a control signal, and a controller 30 configured to control on/off of the relay 20.

The battery 10 is an element for storing electrical energy to output power of a low voltage (e.g., about 12 V). The battery 10 may provide electrical power to various loads that operate when the vehicle is started. In some cases, the battery 10 may be used to provide electrical power for low-voltage loads when the vehicle travels.

In various embodiments, if the battery 10 is applied to an eco-friendly vehicle that drives a motor with a high voltage power, the battery 10 may be referred to as a low-voltage battery or auxiliary battery in order to distinguish the battery 10 from a high-voltage battery for driving the motor. In a typical internal combustion engine vehicle, the battery 10 may be simply referred to as a battery.

A lead acid battery or a lithium battery may be employed as the battery 10. The lead acid battery, which is relatively inexpensive, has been mainly used, but the lithium battery is increasingly replacing the lead acid battery as the lithium battery has high reliability and a long service life. Performance of the lithium battery is significantly degraded when the voltage thereof decreases below a certain voltage. Accordingly, the lithium battery uses a relay 20 for interrupting connection between the battery and the vehicle system when the voltage of the battery decreases below a certain reference voltage. Various embodiments are increasingly applied to a vehicle employing a lithium battery as the battery 10, but the battery 10 is not limited to the lithium battery. Embodiments are also applicable to a case where a lead acid battery is used as the battery 10.

The relay 20 is an element for establishing or interrupting electrical connection between the battery 10 (e.g., a lithium battery) and the vehicle system. The relay 20 has a front terminal 21 electrically connected to the battery 10 and a rear terminal 22 connected to a side of a vehicle system. By electrically connecting and disconnecting the front terminal 21 and the rear terminal 22, the state of electrical connection between the battery 10 and the vehicle system including various loads may be determined.

The On/Off state of the relay 20 is determined by a control signal input by the controller 30. For example, when a control signal having a specific voltage is applied to one end of a coil 23 in the relay 20 to set the relay 20 in the On state, the front terminal 21 and rear terminal 22 of the relay 20 may be electrically connected. In addition, when a control signal having a specific voltage is applied to the other end of the coil 23 in the relay 20 to set the relay 20 in the Off state, the front terminal 21 and rear terminal 22 of the relay 20 may be electrically disconnected.

Typically, when the battery 10 operates under a condition for normal operation of the battery 10 (e.g., when the voltage of the battery 10 is between a predetermined upper voltage limit and a predetermined lower voltage limit), the relay 20 is controlled to be maintained in the connected state (e.g., the On state). If the voltage of the battery 10 is less than or equal to a predetermined reference value (e.g., lower voltage limit), the relay 20 may be controlled to be set in a disconnected state (e.g., the Off state). The control signal for determining the On/Off state of the relay 20 is provided by the controller 30.

The relay 20 may receive the voltage of the battery 10 (e.g., the voltage of the front terminal 21 of the relay 20) and provide the relay 20 with a control signal for controlling the relay 20 according to the value of the received voltage.

In one embodiment, the controller 30 may be provided with power for operation from a junction box 50 connected to the rear terminal 22 of the relay 20. To control the relay 20, the controller 30 may be connected to a connection node between the battery 10 and relay 20 and to the rear terminal of the relay 20 (e.g., a connection node between the relay 20 and the junction box 50). Thereby, the controller 30 may be provided with a voltage V1 of the battery and the voltage of the junction box 50 (e.g., an external charge voltage, which will be described later).

In various embodiments, the controller 30 may be implemented by a battery management system (BMS) controller applied to a vehicle. For example, in consideration of the trend of integrated packaging of a high-voltage battery and a low-voltage battery (e.g., auxiliary battery) in an eco-friendly vehicle, the controller 30 may be implemented by one BMS controller that manages the high-voltage battery and the low-voltage battery simultaneously. In the specification and the accompanying drawings, the term "BMS" may be used to refer to the controller.

More specifically, to charge the battery 10, the controller 30 may appropriately control the connection state of the relay 20 based on voltages at the front terminal 21 and rear terminal 22 of the relay 20, the magnitude of current supplied to the battery 10, or whether the vehicle has been started after the relay 20 is switched from the Off state (e.g., electrically disconnected state) to the On state.

In FIG. 1, reference numeral 50 represents a junction box for establishing electrical connection between the relay 20 and loads, and reference numeral 60 represents various electrical loads operated by low-voltage power provided from a low-voltage DC-DC converter (LDC) and the battery 10 or from the LDC.

Operation of the system for charging a vehicle battery according to various embodiments, (e.g., the charge controller operation of the controller 30) will be clearly understood from the following description of a method for charging a vehicle battery.

Figure 2:
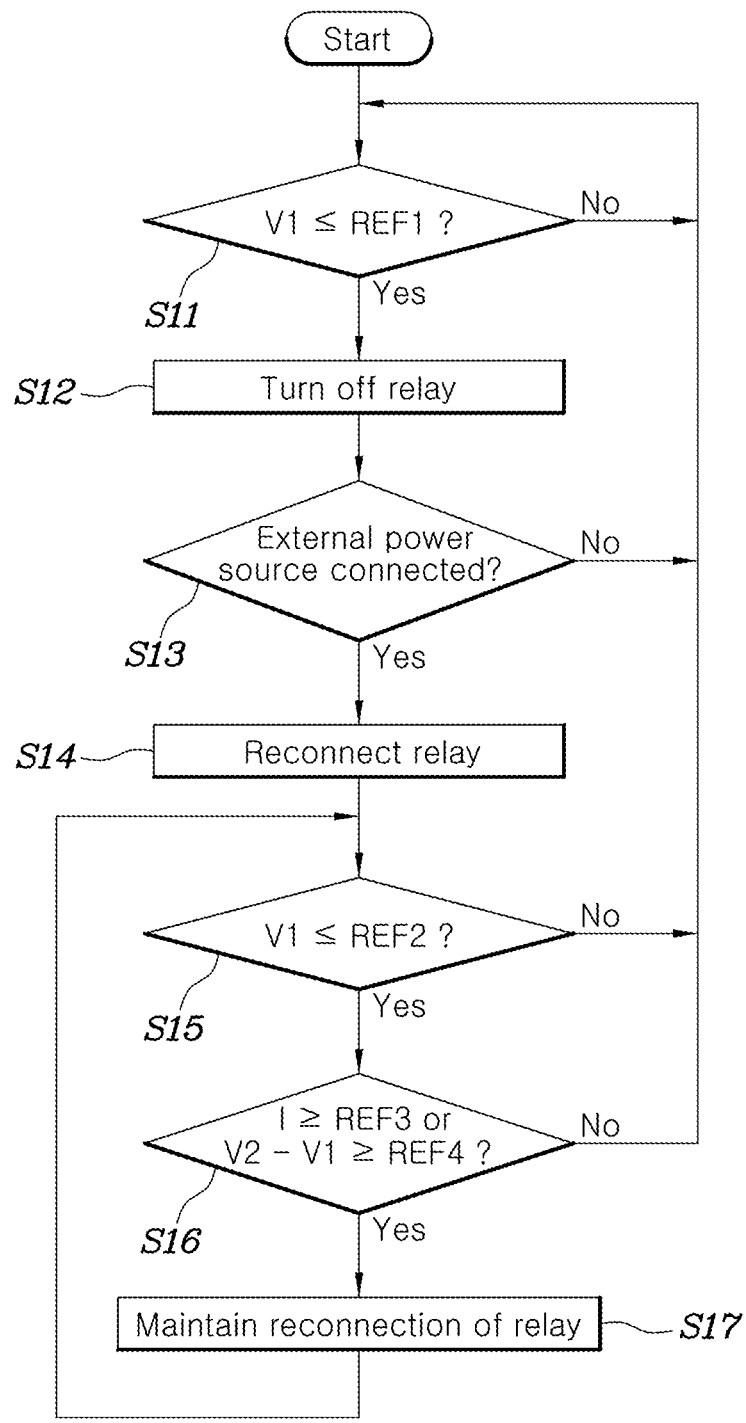
FIG. 2 is a flowchart illustrating a method for charging a vehicle battery according to an embodiment.

FIG. 2 is a flowchart illustrating a method for charging a vehicle battery according to an embodiment.

If the voltage V1 becomes less than or equal to a predetermined reference value REF1 (S11), the controller 30 controls the relay 20 to be set in the Off state (e.g., the disconnected state) in order to prevent overdischarge of the battery 10 (S12). The Off state of the relay 20 may be maintained until a separate instruction for reconnection of the relay is input. Even if the reference value REF1, which is set to prevent overdischarge of the battery 10, is a voltage enabling the vehicle to be started, and electrical connection between the battery 10 and the vehicle system is interrupted by setting the relay 20 in the Off state, leaving the relay 20 in this state for a long time may lead to natural discharge, which causes the voltage of the battery 10 to decrease to a voltage at which the vehicle cannot be started. As another example, in the event that the reference value REF1 set to prevent overdischarge of the battery 10 is a voltage at which performance of the battery 10 starts to be drastically degraded, the vehicle may not be started at the voltage of the battery 10 when the voltage of the battery 10 decreases to the reference value REF1, even if the voltage of the battery 10 does not decrease below the reference value REF1.

Accordingly, in many cases, once the voltage of the battery 10 is lowered below the reference value REF1, and thus the relay 20 is controlled to be set in the disconnected state, an external power source is to be connected to charge the battery 10 or to be used to jumpstart the vehicle.

The external power source P may be connected via the junction box 50 (S13). When the external power source P is connected to the junction box 50, the controller 30 may be supplied with power and may control the relay 20 to be reconnected (S14). Once the relay 20 in the disconnected state is reconnected and set in the connected state, the battery 10 may be normally charged by the external power source.

According to an embodiment, when the battery 10 is charged by reconnection of the relay 20, a new control technique of controlling the relay 20 according to the voltage level of the battery 10 is applied.

More specifically, after the battery 10 is reconnected (S14), the controller 30 compares the voltage V1 of the battery 10 with a predetermined reference value REF2. If the voltage V1 of the battery 10 is less than or equal to the reference value REF2, the controller 30 enters a reconnection charge mode. Herein, the reconnection charge mode refers to a mode in which charging is performed by reconnection of the relay 20. In this mode, the control operation of interrupting the relay 20 due to the low voltage level of the battery 10 is not performed. In other words, the reference value REF2 is a voltage by which it may be determined that the battery 10 is sufficiently charged with power to start the vehicle. In the reconnection charge mode, if the voltage of the battery 10 is less than or equal to the reference value REF2, control of the relay for prevention of overdischarge of the battery 10 is not performed such that the battery 10 is forcibly charged. If the voltage V1 of the battery 10 is greater than the reference value REF2 for more than a predetermined time, the controller 30 may release the reconnection charge mode.

After entering the reconnection charge mode, the controller 30 may control on/off of the relay 20 to charge the battery 10, further taking into consideration the magnitude of the current provided to the battery 10, the difference in voltage between the front terminal 21 and rear terminal 22 of the relay 20, and the like.

For example, a current sensor 40 may be additionally installed between the rear terminal 22 of the relay 20 and the vehicle system or the junction box 50. Thereby, if a current supplied to the battery 10, which is detected by the current sensor 40, is greater than or equal to a predetermined reference value REF3, or the difference in voltage between the front terminal 21 and the rear terminal 22 of the relay 20 is greater than or equal to a predetermined reference value REF4, the controller 30 may perform a control operation so as not to turn off the relay 20 (S17).

The reason for performing the control operation in consideration of the current supplied to the battery 10 and the difference in voltage between the front terminal 21 and the rear terminal 22 of the relay 20, as described above, is that when the charge level of the battery 10 is low and thus the battery 10 is to be charged, the magnitude of the current supplied to the battery 10 by the external power source P connected to the junction box 50 becomes greater than or equal to the reference value REF3. Further, the voltage applied to the front terminal 21 of the relay 20 (e.g., the voltage V1 of the battery 10) becomes less than the voltage applied to the rear terminal 22 of the relay 20 by the external power source P by more than the reference value REF4.

Figure 3:
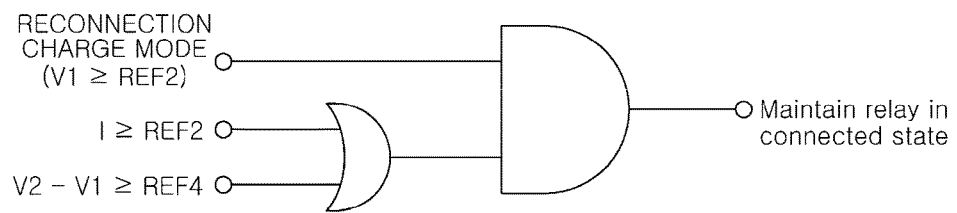
FIGS. 3 and 4 illustrate control logic implemented in a controller of a system for charging a vehicle battery according to an embodiment.

To implement control of the controller 30, logic as shown in FIG. 3 may be implemented in the controller 30. The result of comparison between the current supplied to the battery 10 and the reference value REF3 and the result of comparison between the difference in voltage between the front terminal 21 and the rear terminal 22 of the relay 20 and the reference value REF4 are input to an OR logic gate. If any one of the two results satisfies a condition, an Enable output is provided. An indication about whether the reconnection charge mode is set and the output of the OR logic gate are input to an AND logic gate. If both inputs satisfy a condition, an Enable output may be provided. In other words, if at least one of the comparison result of the current supplied to the battery 10 and the comparison result of the difference in voltage between the front terminal 21 and the rear terminal 22 of the relay 20 satisfies a condition, the relay 20 may be controlled to be maintained in the connected state.

As the battery 10 is charged by reconnection of the relay 20 through the aforementioned control operation, the system and method for charging a vehicle battery according to various embodiments may address the problem of failing to appropriately charge the battery 10, which is caused by turning off the relay 20 when the voltage of the battery 10 is less than a voltage for prevention of overdischarge of the battery.

In one embodiment, as soon as the vehicle started in the reconnection charge mode is turned off, the controller 30 may perform the relay 20 to be set in the disconnected state. Subsequently, the controller 30 may attempt reconnection of the relay 20.

Such control operation is intended to provide that the battery 10 is sufficiently charged, and the controller 30 is provided with power from the battery to control the relay 20 in the event that the vehicle is turned off with the external power source P removed after the controller 30 reconnects the relay 20 to charge the battery 10.

In the reconnection charge mode, the controller 30 maintains the relay 20 in the connected state. If the controller 30 is not supplied with normal power from the battery 10 as the vehicle is turned off, the relay 20 is maintained in the connected state because connection of the relay 20 cannot be interrupted even if the condition for prevention of overdischarge is satisfied. Thereby, the battery 10 is excessively discharged, and performance thereof is degraded.

In one embodiment, as soon as the vehicle started in the reconnection charge mode is turned off, the controller 30 may forcibly turn off the relay 20 to prevent overdischarge of the battery 10, which is caused by maintaining the relay 20 in the connected state.

Figure 4:
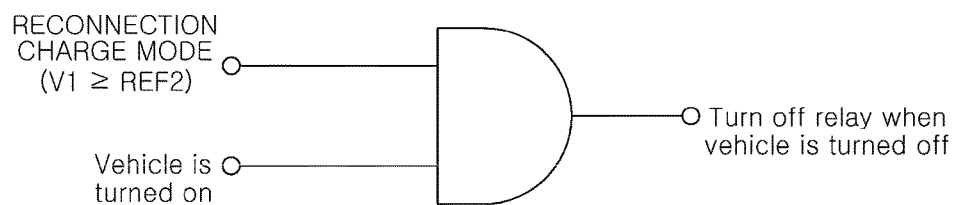

To implement such controller operation, the controller 30 may include logic, as shown in FIG. 4. In other words, the controller 30 inputs an indication of whether the reconnection charge mode is set and an indication of whether the vehicle has been started to the AND logic gate. If both inputs satisfy a condition, the controller 30 controls the relay 20 to be set in the disconnected state when the vehicle is turned off.

As described above, when the battery is charged through reconnection of the relay for determining the state of electrical connection between the battery and the vehicle system after connection of the relay is interrupted, the battery charging method according to various embodiments may provide that the battery is sufficiently charged by stopping control for prevention of overdischarge and maintaining the relay in the connected state by setting the reconnection charge mode.

In addition, if the vehicle is turned off with an external power source removed while the battery is not sufficiently charged, the relay is forcibly disconnected. Thereby, degradation of performance of the battery resulting from overdischarge of the battery, which is caused by maintaining the relay in the connected state, may be prevented.

As is apparent from the above description, with a system and method for charging a vehicle battery configured as above, when the battery is charged through reconnection of a relay for determining the state of electrical connection between the battery and the vehicle system after the relay is disconnected, control of the relay for prevention of overdischarge is stopped, and the relay is maintained in the connected state by setting a reconnection charge mode. Thereby, the battery may be sufficiently charged.

In addition, according to the system and method for charging the vehicle battery, if an external power source is cut off and the vehicle is turned off without the battery being sufficiently charged, connection of the relay is forcibly interrupted. Thereby, overdischarge of the battery and degradation of performance of the battery, caused by maintaining the relay in the connected state, may be prevented.

Although the embodiments have been disclosed for illustrative purposes, those skilled in the art will appreciate that various modifications, additions, and substitutions are possible without departing from the scope and spirit of the invention as disclosed in the accompanying claims.

What is claimed is:

1. A system for charging a battery for a vehicle, the system comprising:
   a relay configured to establish/interrupt electrical connection between the battery and a vehicle system supplied with power from the battery; and
   a controller configured to:
   monitor a voltage of the battery;
   control the relay to interrupt the electrical connection when a voltage of the battery is less than or equal to a first predetermined reference value; and
   control the relay to establish the electrical connection when a predetermined condition for reconnection is satisfied while the relay is electrically disconnected,
   wherein the controller controls the relay to be electrically connected to charge the battery through an external power source while the electrical connection is interrupted, and then controls a connection state of the relay based on the voltage of the battery, based on a voltage and a current of the relay at a side of the vehicle system, and based on whether a vehicle is started.

2. The system of claim 1, further comprising:
   a current sensor configured to detect a current to a terminal of the relay at the side of the vehicle system,
   wherein when the voltage of the battery is less than or equal to a second predetermined reference value and a detected value of the current sensor corresponding to a current supplied to the battery is greater than a third predetermined reference value, the controller is configured to control the relay to maintain the electrical connection.

3. The system of claim 1, wherein the controller is configured to monitor a voltage of a terminal of the relay at the side of the vehicle system,
   wherein when the voltage of the battery is less than or equal to a second predetermined reference value and a difference in voltage between the voltage of the battery and a voltage of the terminal at the side of the vehicle system is greater than or equal to the second predetermined reference value, the controller is configured to control the relay to maintain the electrical connection.

4. The system of claim 1, wherein, when the voltage of the battery is less than or equal to a second predetermined reference value and a vehicle switches from an On state to an Off state, the controller is configured to control the relay to interrupt the electrical connection.

5. A method for charging a battery for a vehicle by controlling an electrical connection state of a relay configured to establish/interrupt electrical connection between the battery and a vehicle system, the battery supplying power to the vehicle system, the method comprising:
   controlling the relay to establish the electrical connection when an external power source is connected to a terminal of the relay at a side of the vehicle system to charge the battery; and
   determining the electrical connection state of the relay establishing the electrical connection based on a voltage of the battery, a voltage and a current of the relay at the side of the vehicle system, and whether the vehicle is started.

6. The method of claim 5, wherein the determining comprises controlling the relay to maintain the electrical connection when the voltage of the battery is less than or equal to a second predetermined reference value and a value of a detected current supplied to the battery is greater than a third predetermined reference value.

7. The method of claim 5, wherein the determining comprises controlling the relay to maintain the electrical connection when the voltage of the battery is less than or equal to a second predetermined reference value and a difference between the voltage of the battery and a voltage of the terminal at the side of the vehicle system is greater than the second predetermined reference value.

8. The method of claim 5, wherein the determining comprises controlling the relay to interrupt the electrical connection when the voltage of the battery is less than or equal to a second predetermined reference value and the vehicle switches from an On state to an Off state.

9. A system for charging a battery for a vehicle, the system comprising:
   a relay configured to determine electrical connection between the battery and a vehicle system, the vehicle system being supplied with power from the battery; and
   a controller configured to control a connection state of the relay, the controller being configured to:
      enter a reconnection charge mode when a voltage of the battery is less than or equal to a predetermined voltage with an external power source connected and the relay reconnected;
      control the relay to maintain the electrical connection when a magnitude of a current supplied from the external power source to the battery is greater than or equal to a first predetermined reference value, or when a difference in voltage between opposite terminals of the relay is greater than or equal to a second predetermined reference value in the reconnection charge mode; and
      control the relay to interrupt the electrical connection when the vehicle switches from an On state to an Off state in the reconnection charge mode.

10. The system of claim 9, wherein the controller is configured to release the reconnection charge mode when the voltage of the battery is maintained to be greater than the predetermined voltage for more than a third predetermined reference value.

* * * * *